(12) United States Patent
Datz et al.

(10) Patent No.: US 12,025,045 B2
(45) Date of Patent: Jul. 2, 2024

(54) EXHAUST GAS SYSTEM FOR AN INTERNAL COMBUSTION ENGINE

(71) Applicant: Purem GmbH, Neunkirchen (DE)

(72) Inventors: Wolfgang Datz, Tuebingen (DE); Ralph Kanzleiter, Ebersbach (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/889,552

(22) Filed: Aug. 17, 2022

(65) Prior Publication Data

US 2023/0057647 A1 Feb. 23, 2023

(30) Foreign Application Priority Data

Aug. 17, 2021 (DE) .................... 10 2021 121 289.8

(51) Int. Cl.
| | |
|---|---|
| *F01N 3/28* | (2006.01) |
| *F01N 13/14* | (2010.01) |
| *F01N 3/021* | (2006.01) |
| *F01N 3/10* | (2006.01) |
| *F01N 3/20* | (2006.01) |
| *F01N 13/00* | (2010.01) |
| *F01N 13/18* | (2010.01) |

(52) U.S. Cl.
CPC ......... *F01N 3/2892* (2013.01); *F01N 13/143* (2013.01); *F01N 3/021* (2013.01); *F01N 3/106* (2013.01); *F01N 3/108* (2013.01); *F01N 3/2066* (2013.01); *F01N 3/2882* (2013.01); *F01N 13/009* (2014.06); *F01N 13/0097* (2014.06); *F01N 13/1872* (2013.01); *F01N 2240/20* (2013.01); *F01N 2250/02* (2013.01); *F01N 2260/20* (2013.01); *F01N 2450/22* (2013.01); *F01N 2530/26* (2013.01); *F01N 2610/02* (2013.01); *F01N 2610/1453* (2013.01)

(58) Field of Classification Search
CPC ........ F01N 3/021; F01N 3/106; F01N 3/2066; F01N 3/2882; F01N 3/2892; F01N 13/009; F01N 13/0097; F01N 13/143; F01N 13/1872; F01N 2240/20; F01N 2250/02; F01N 2260/20; F01N 2450/22; F01N 2530/26; F01N 2610/02; F01N 2610/1453
USPC ................... 60/296, 297, 299, 301, 311, 324
See application file for complete search history.

(56) References Cited

U.S. PATENT DOCUMENTS

| | | | |
|---|---|---|---|
| 4,685,534 A * | 8/1987 | Burstein ............. | F01N 13/1894 181/251 |
| 8,082,732 B2 | 12/2011 | Nefischer | |
| 9,581,067 B2 * | 2/2017 | Guilbaud ............ | B01F 25/3141 |

(Continued)

FOREIGN PATENT DOCUMENTS

| | | | |
|---|---|---|---|
| CN | 111764987 A | * | 10/2020 |
| DE | 10 2009 027 713 A1 | | 1/2011 |

(Continued)

*Primary Examiner* — Jorge L Leon, Jr.
(74) *Attorney, Agent, or Firm* — Walter Ottesen, P.A.

(57) ABSTRACT

An exhaust gas system for an internal combustion engine includes at least one component which delimits an exhaust gas flow volume via an outer wall and, on an inner side of the outer wall which faces the exhaust gas flow volume, supports at least one shielding element. An intermediate space is formed between the outer wall and the shielding element. At least one connecting molding on the shielding element is directed toward the outer wall and is connected fixedly to the outer wall.

13 Claims, 3 Drawing Sheets

(56) References Cited

U.S. PATENT DOCUMENTS

| | | | |
|---|---|---|---|
| 9,604,170 B2 | 3/2017 | Kimura | |
| 2013/0188444 A1* | 7/2013 | Palmer | B01F 25/43 366/337 |
| 2014/0318112 A1* | 10/2014 | Solbrig | F01N 3/208 60/324 |
| 2016/0047288 A1* | 2/2016 | Arrowsmith | F01N 3/206 60/274 |
| 2016/0061078 A1* | 3/2016 | Schmidt | F01N 3/2066 60/295 |
| 2016/0265408 A1 | 9/2016 | Zeyer et al. | |
| 2017/0204770 A1* | 7/2017 | Kimura | F02M 26/03 |
| 2018/0169728 A1* | 6/2018 | Wolf | F01N 13/18 |
| 2018/0187586 A1 | 7/2018 | Kast et al. | |
| 2019/0009320 A1* | 1/2019 | Fan | B21D 13/04 |
| 2019/0249584 A1* | 8/2019 | Preissler | B01F 23/2132 |
| 2020/0179863 A1* | 6/2020 | Kruse Mortensen | B01D 47/06 |
| 2021/0262379 A1* | 8/2021 | Bucknell | F01N 13/102 |

FOREIGN PATENT DOCUMENTS

| | | | | |
|---|---|---|---|---|
| DE | 10 2013 223 296 A1 | 5/2015 | | |
| DE | 10 2014 214 093 A1 | 5/2015 | | |
| DE | 202018105198 U1 * | 1/2020 | | B60R 13/0876 |
| EP | 2 984 311 B1 | 5/2018 | | |
| EP | 3 372 797 B1 | 12/2018 | | |
| JP | 2003193835 A | 7/2003 | | |
| JP | 2005-155404 A | 6/2005 | | |
| JP | 2007247549 A | 9/2007 | | |
| WO | WO-2019138427 A1 * | 7/2019 | | |
| WO | WO-2021027327 A1 * | 2/2021 | | B01D 53/9418 |

\* cited by examiner

EXHAUST GAS SYSTEM FOR AN INTERNAL COMBUSTION ENGINE

CROSS REFERENCE TO RELATED APPLICATION

This application claims priority of German patent application no. 10 2021 121 289.8, filed Aug. 17, 2021, the entire content of which is incorporated herein by reference.

TECHNICAL FIELD

The present invention relates to an exhaust gas system for an internal combustion engine.

BACKGROUND

In the case of internal combustion engines provided in vehicles or exhaust gas systems assigned to them, a critical phase with regard to pollutant emissions is a cold start, in which the internal combustion engine and also the different components of the exhaust gas system have comparatively low temperatures and therefore exhaust gas treatment units which are contained in an exhaust gas system of this type such as, for example, oxidation catalytic converters, particular filters or SCR catalytic converters, substantially cannot be active, for example, for exhaust gas purification. In order to keep this phase with comparatively high pollutant emissions as short as possible, it is necessary for the various system regions of an exhaust gas system to be brought as rapidly as possible to a temperature which is sufficiently high that a sufficient reduction of the pollutant proportion in the exhaust gas which is injected from an internal combustion engine can be ensured.

SUMMARY

It is an object of the present disclosure to provide an exhaust gas system for an internal combustion engine, in the case of which exhaust gas system thermal shielding which decreases the heat output to the outside can be achieved using structurally simple measures.

According to the invention, this object is achieved by way of an exhaust gas system for an internal combustion engine, comprising at least one component which limits an exhaust gas flow volume by way of an outer wall and, on an inner side of the outer wall which faces the exhaust gas flow volume, supports at least one shielding element, an intermediate space being formed between the outer wall and the shielding element, and at least one first connecting molding which is directed towards the outer wall and is connected fixedly to the outer wall being provided on the at least one shielding element, and/or at least one second connecting molding which is directed towards the at least one shielding element and is connected fixedly to the at least one shielding element being provided on the outer wall.

As a result of the provision of one or more shielding elements on one or more components of an exhaust gas system, the outer wall which is covered on its inner side and is generally in heat transfer contact with the surroundings on its outer side is shielded at least in regions against the direct incident flow with exhaust gas. Since a shielding element of this type is at a spacing from the outer wall and is in contact with the latter merely in the region of the connecting moldings, heat which is transported in the exhaust gas is transferred only to a very limited extent to the outer wall and dissipated via the latter to the outside. As a result, thermal losses are considerably limited, which firstly results in more rapid heating of the exhaust gas system in a cold start phase, and secondly decreases the thermal loading of system regions of the vehicle which are provided in the surroundings of an exhaust gas system of this type, with the result that there is also the possibility for system regions of this type to be positioned more closely to the exhaust gas system.

In order for it to be possible for a satisfactory shielding characteristic to be provided with sufficient stability, it is proposed that the at least one shielding element is a sheet metal molding, and/or that the at least one shielding element has a thickness in the range from 0.6 mm to 1.0 mm, preferably approximately 0.8 mm.

The outer wall can also comprise at least one sheet metal molding. Furthermore, in order to achieve a satisfactory shielding effect, the intermediate space can have a dimension in the range from 0.5 mm to 6 mm.

In order firstly to avoid thermal contact and secondly to avoid rattling noise produced by way of mutual contact, it is proposed that at least one, preferably every shielding element comprises an outer edge region which is positioned at a spacing from the outer wall. This means that a shielding element of this type is in physical contact with the component connected to it or its outer wall substantially only in the region of the connecting moldings.

In order, even in the case of complex geometries of the outer wall of the housing, for it to be possible for the outer wall to be shielded substantially completely against the direct incident flow with exhaust gas, a plurality of shielding elements can be provided on a component of this type or its outer wall. In order to avoid direct incident flow of the outer wall of the component where shielding elements of this type adjoin one another, at least two shielding elements can be arranged so as to overlap one another in regions in an adjoining region.

In order to avoid mutual contact and therefore associated rattling noise even in an overlap region of this type, it is proposed that an intermediate space is formed between the shielding elements which are arranged so as to overlap one another in the adjoining region.

For a thermally durable and chemically resistant connection, in the case of at least one, preferably each connecting molding, the at least one shielding element can be connected to the outer wall by way of an integrally joined connection, preferably welding such as, for example, resistance welding, laser welding or puddle welding.

For a compact embodiment, the exhaust gas system can comprise at least one first exhaust gas treatment unit with an upstream inlet region and a downstream outlet region, and at least one second exhaust gas treatment unit with an upstream inlet region and a downstream outlet region, and a connecting housing which is connected to the downstream outlet region of the at least one first exhaust gas treatment unit and the upstream inlet region of the at least one second exhaust gas treatment unit. Here, the connecting housing can provide one component.

In the case of an embodiment which can be realised simply in structural terms, the connecting housing can comprise a first housing element with an inlet opening and an outlet opening, the downstream outlet region of the at least one first exhaust gas treatment unit being connected to the connecting housing in the region of the inlet opening, and the upstream inlet region of the at least one second exhaust gas treatment unit being connected to the connecting housing in the region of the outlet opening. Furthermore, the connecting housing can comprise a second housing element which, with the first housing element, encloses a connecting volume, through which exhaust gas can flow. If the connecting housing provides a component which is shielded on its inner side by way of at least one shielding element, the outer wall can comprise the first housing element and/or the second housing element.

Since a flow deflection of the exhaust gas stream can take place in the region of the connecting housing and, here, regions of the second housing element which lie opposite, in particular, the inlet opening or the outlet opening or a transition region between them can interact with the exhaust gas stream, it is proposed in order to achieve a satisfactory shielding effect that at least one shielding element is provided on an inner side, facing the connecting volume, of the second housing element in a region which lies opposite the inlet opening and/or in a region which lies opposite the outlet opening and/or in a region which lies opposite a transition region which is formed between the inlet opening and the outlet opening.

For adaptation to complex geometries of the connecting housing, at least two shielding elements which overlap one another in the region which lies opposite the transition region of the first housing element can be provided on the second housing element.

As an alternative or in addition to the provision of at least one shielding element on the second housing element, at least one shielding element can be provided on the first housing element in the region of the transition region.

For attachment to further (for example, tubular) elements of an exhaust gas system, the upstream inlet region of the first exhaust gas treatment unit can be connected to an inlet housing. The inlet housing can preferably provide one component.

The first exhaust gas treatment unit can comprise an oxidation catalytic converter and/or a particulate filter and/or an SCR catalytic converter. The second exhaust gas treatment unit can comprise an SCR catalytic converter.

When, in particular, the second exhaust gas treatment unit comprises an SCR catalytic converter, a reagent dispensing arrangement for dispensing reagent into exhaust gas which flows through the connecting housing can be provided on the connecting housing for thorough mixing of exhaust gas with a reagent upstream of the SCR catalytic converter.

BRIEF DESCRIPTION OF THE DRAWINGS

The invention will now be described with reference to the drawings wherein.

DESCRIPTION OF THE PREFERRED EMBODIMENTS

Figure 1:
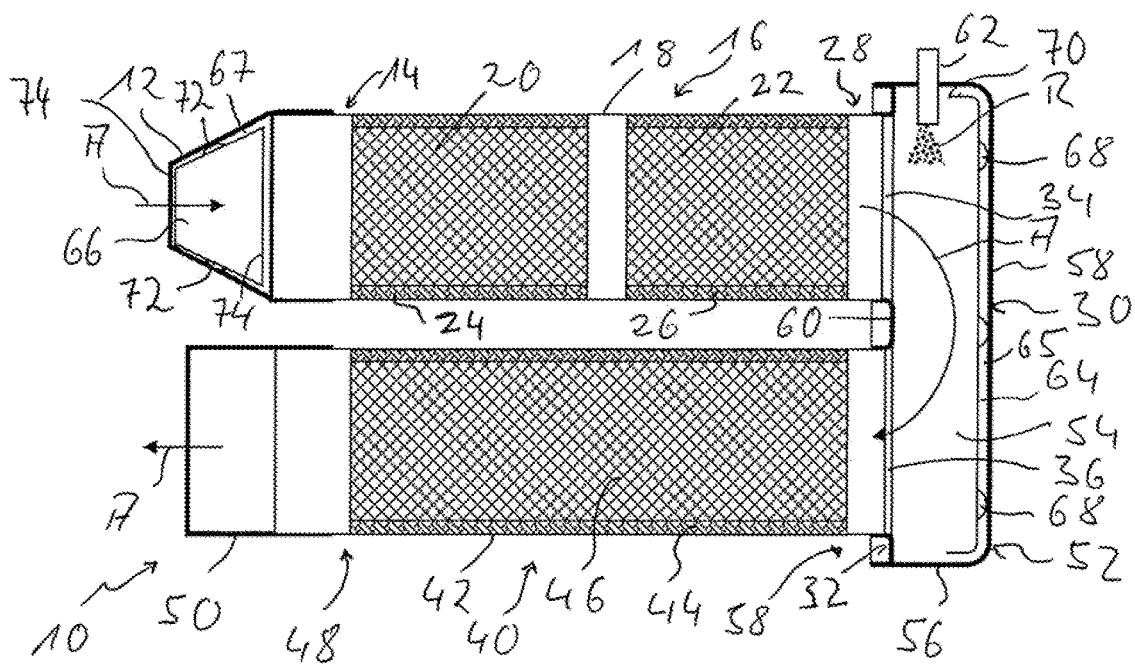
FIG. 1 shows an outline longitudinal sectional illustration of an exhaust gas system for an internal combustion engine.

In FIG. 1, an exhaust gas system or a part of an exhaust gas system for an internal combustion engine of a vehicle is denoted generally by 10. In an upstream region thereof, the exhaust gas system 10 includes an inlet housing 12 which widens in the flow direction of exhaust gas A which is introduced into the exhaust gas system 10 or flows therein. An upstream inlet region 14 of a first exhaust gas treatment unit which is denoted generally by 16 is connected to the inlet housing 12. In a tubular housing 18, the first exhaust gas treatment unit 16 can include an oxidation catalytic converter 20 and/or a particulate filter 22 which are arranged so as to follow one another in the flow direction in the tubular housing 18 and can be supported therein, for example, by way of a fiber mat 24, 26 or the like. Furthermore, the first exhaust gas treatment unit 16 can include, for example, an SCR catalytic converter which can be arranged in the housing 18, for example, in combination with a diesel oxidation catalytic converter or in combination with a diesel particulate filter.

A downstream outlet region 28 of the first exhaust gas treatment unit 16 is connected to a connecting housing which is denoted in general by 30. The connecting housing 30 includes a first housing element 32 which is configured, for example, in one piece as a sheet metal molding with an inlet opening 34, in the region of which the tubular housing 18 of the first exhaust gas treatment unit 16 is connected to the connecting housing 30 in a gas-tight manner. Furthermore, the first housing element 32 includes an outlet opening 36, in the region of which an upstream inlet region 38 of the second exhaust gas treatment unit 40 is connected to the connecting housing 30 in a gas-tight manner.

The second exhaust gas treatment unit 40 comprises a housing 42 which is, for example, tubular and in which an SCR catalytic converter 46 is supported, for example, by means of a fiber mat 44. A downstream outlet region 48 of the second exhaust gas treatment unit 40 is attached, for example, to an outlet housing 50 or to an element of the exhaust gas system 10, which element is, for example, tubular, and leads, for example, to a muffler.

Furthermore, the connecting housing 30 includes a second housing element 52 which is provided, for example, in one piece as a sheet metal molding. Whereas the first housing element 32 can be, for example, of substantially plate-like configuration and can have edge-like moldings which are provided in the region of the inlet opening 34 or the outlet opening 36 for connection to the exhaust gas treatment units 16, 40, the second housing element 52 can be of pot-like configuration, in order, together with the first housing element 32, to a enclose a connecting volume 54, through which exhaust gas A can flow. Here, a circumferential wall 56 of the second housing element 52 can engage over an edge region which is formed in the outer circumferential region of the first housing element 32, and can be connected to the latter in a fixed and gas-tight manner, for example, by way of welding. A bottom wall 58 of the second housing element 52 lies opposite the first housing element 32, in particular the inlet opening 34, the outlet opening 36 and a transition region 60, formed in between, of the first housing element 32.

A reagent dispensing arrangement 62 which is generally called an injector is supported on the connecting housing 30 or the second housing element 52 thereof. The reagent dispensing arrangement 62 dispenses a reagent R, for example a mixture of urea and water, into the connecting volume 54, with the result that exhaust gas A which flows in the connecting volume 54 can be mixed with the reagent R, and a mixture of exhaust gas A and reagent R or reagent vapor can flow in the upstream inlet region 38 into the second exhaust gas treatment unit 40.

It is to be noted that the configuration (described above in relation to FIG. 1) of an exhaust gas system can be varied in a wide variety of ways. For example, it is possible for the two exhaust gas treatment units or the tubular housings 18, 42 thereof to not be arranged substantially parallel and so as to lie next to one another or so as to overlap one another in their longitudinal direction, with the result that the connecting housing 30 also substantially provides a deflection housing, in which the exhaust gas stream is deflected by approximately 180° during the transition between the two exhaust gas treatment units 16, 40, but rather for the two exhaust gas treatment units to be provided on the connecting housing so as to adjoin one another substantially in the longitudinal direction. Furthermore, for example, two first exhaust gas treatment units 16 and/or two second exhaust gas treatment units 40 can be arranged substantially parallel to one another and can be connected to the connecting housing 30. Different components which serve for the exhaust gas treatment from the components described above in relation to FIG. 1 can also be positioned in the two exhaust gas treatment units 16, 40.

In the case of the exhaust gas system 10 which is shown in FIG. 1, shielding elements 64, 66 which are provided as sheet metal moldings are provided on the connecting housing 30 and on the inlet housing 12. The shape of the shielding element 64 which is provided on the connecting housing 30 is adapted substantially to the contour of the second housing element 52, with the result that it covers, for example, a substantial region of the bottom wall 58. At least one part of the circumferential wall 56 can also be covered by the shielding element 64. The shielding element 64 which is constructed with sheet metal material with a thickness, for example, in the region of 0.8 mm is at a spacing from the second housing element 52, which spacing can lie in the range from 0.5 mm to 6 mm and can vary across the shielding element 64, with the result that an intermediate space 65 is formed between the shielding element 64 and the second housing element 52.

Connecting moldings 68 which are formed by way of molding of a sheet metal blank are provided on the shielding element 64 at a plurality of positions, in the region of which connecting moldings 68 the shielding element 64 bears against the inner side of the bottom wall 58 of the second housing element 52 and is therefore connected fixedly by way of an integrally joined connection, in particular welding such as, for example, resistance welding, laser welding or puddle welding. The shielding element 64 is arranged at a spacing from the second housing element 52 in the regions between or outside the connecting moldings 68, in particular also in its entire outer edge region 70, with the result that vibrations which occur during operation cannot lead to mutual contact of the shielding element 64 with the second housing element 52.

It is seen in FIG. 1 that the shielding element 64 is provided on the second housing element 52 in regions which lie opposite the inlet opening 34, the outlet opening 36 and also the transition region 60. Therefore, the second housing element 52 of the connecting housing 30 is shielded efficiently against any direct incident flow by way of the exhaust gas A which flows in the connecting volume 54. A direct heat transfer contact between the exhaust gas A and the connecting housing 30 is therefore substantially ruled out in that region of the connecting housing 30 which is shielded by way of the shielding element 64. A direct heat transfer between the shielding element 64 and the connecting housing 30 is restricted to the few regions, in which the shielding element 64 is in contact in the region of its connecting moldings 68 with the second housing element 52. The dissipation of heat from the exhaust gas system 10 by the connecting housing 30 which provides a comparatively large outwardly exposed surface area is therefore reduced considerably, as a result of which it is ensured that the exhaust gas A which flows through the exhaust gas system 10 can be kept at a comparatively high temperature level, and it is therefore ensured that a great part of the heat which is transported in the exhaust gas A can be transferred to the exhaust gas treatment units 16, 40.

The shielding element 66 which is provided on the inlet housing 12 also has a plurality of connecting moldings 72, in the region of which it bears against the inner side of the inlet housing 12 and is therefore connected by way of an integrally joined connection, for example welding. The shape of the shielding element 66 can be adapted to the shape of the inlet housing 12 and, for example, can likewise have a contour which widens in the exhaust gas flow direction. An intermediate space 67 which can have a dimension in the range from 0.5 mm to 6 mm is also formed between the shielding element 66 and the inlet housing 12 or that wall of the inlet housing 12 which supports the shielding element 66. The shielding element 66 is likewise in contact substantially only in the region of the connecting moldings 72 with the inlet housing 12. In the region of its outer edge region 74, the shielding element 66 does not have any connection to or contact with the inlet housing 12. As an alternative, the shielding element 66 might be connected fixedly to the shielding housing 12 by way of welding in that outer edge region 74, by way of which the shielding element 66 is positioned adjacently with respect to an inlet opening of the inlet housing 12.

In the case of that construction of an exhaust gas system 10 which is described above in relation to FIG. 1, the connecting housing 30 and the inlet housing 12 in each case provide one component of the exhaust gas system 10 which supports a or at least one shielding element on an inner side thereof, which faces the exhaust gas flow, and is therefore shielded against direct incident flow with exhaust gas in the region of this outer wall which is covered by the shielding element. It is to be noted that a shielding effect of this type can also be achieved in other regions of an exhaust gas system by way of shielding elements which can fundamentally have the configuration described above in relation to FIG. 1.

As described in the following text, shielding elements of this type can also be of different configuration and/or can be attached in a different way to the components which support them and are therefore shielded by way thereof.

Figure 2:
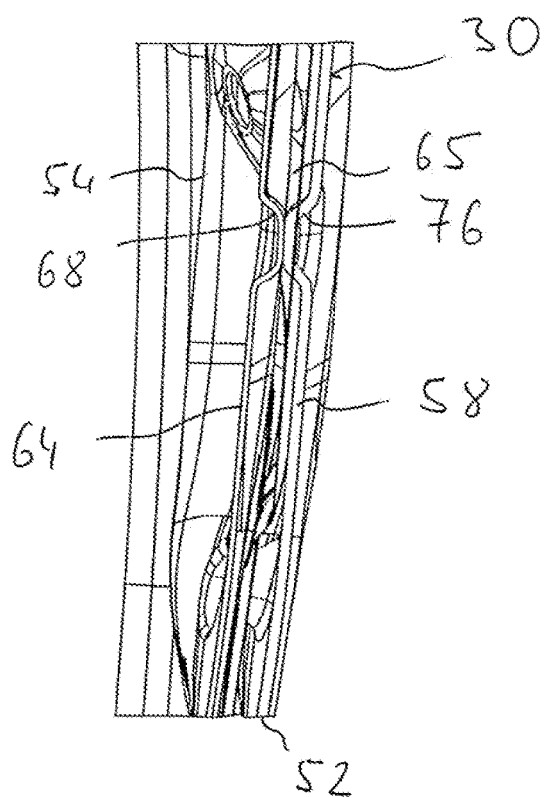
FIG. 2 shows a detailed view of a connecting housing of the exhaust gas system from FIG. 1 with a shielding element which is supported on the connecting housing.

FIG. 2 shows an alternative embodiment of the region of the bottom wall 58 of the second housing element 52 of the connecting housing 30. In the region of the bottom wall 58, the second housing element 52 is covered by the shielding element 64 in the embodiment shown in FIG. 2, in such a way that the intermediate space 65 which has already been addressed above is formed between the bottom wall 58 and the shielding element 64. A plurality of connecting moldings 68 are provided on the shielding element 64. The second housing element 52 likewise has connecting moldings 76 in those regions of the second housing element 52, in which the shielding element 64 is to be fixed by way of its connecting moldings 68 on the second housing element 52. The connecting moldings 68 of the shielding element 64 therefore provide first connecting moldings, whereas the connecting moldings 76 of the second housing element 52 of the connecting housing 30 provide second connecting moldings. Each first connecting molding 68 of the shielding element 64 is preferably assigned the second connecting moldings 76 of the second housing element 52, with the result that the shielding element 64 and the second housing element 52 bear against one another with a first connecting molding 68 and a second connecting molding 76 in each case in a mutually assigned pair, and are connected to one another by way of an integrally joined connection. This provides the possibility for a comparatively great spacing between the shielding element 64 and the second housing element 52 to be provided by way of connecting moldings 68, 76 of comparatively small dimensions in the regions which lie between or around the respective pairs of connecting moldings 68, 76.

Figure 3:
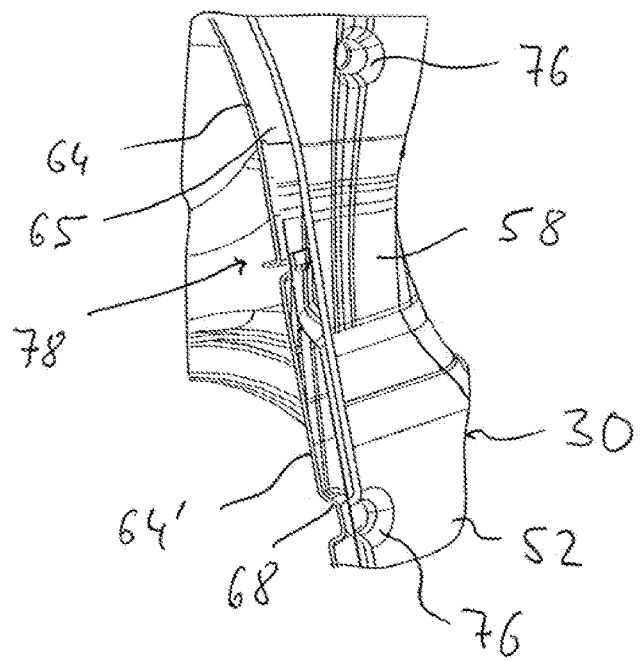
FIG. 3 shows an illustration, corresponding to FIG. 2, with two shielding elements which are supported on the connecting housing.
Figure 4:
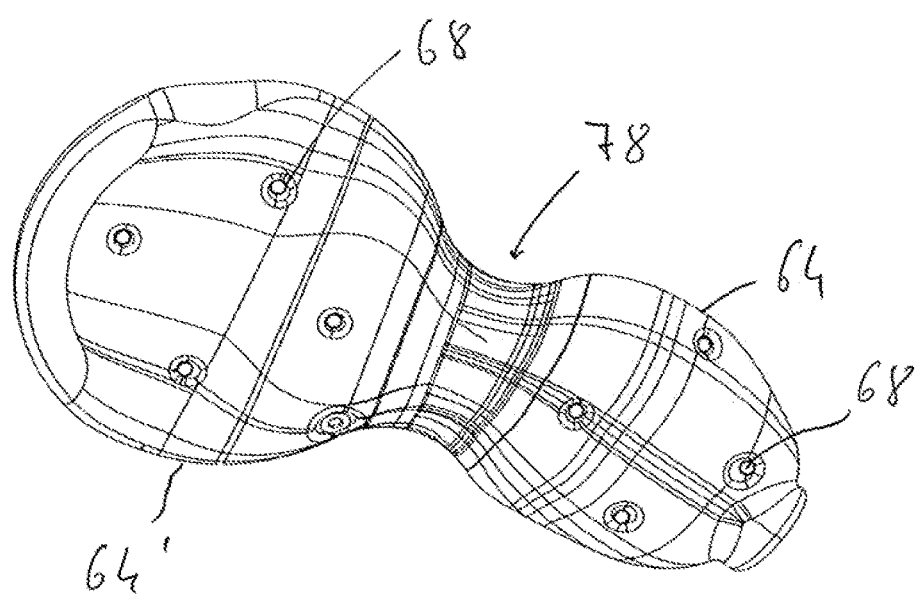
FIG. 4 shows a plan view of the two shielding elements from FIG. 3.

FIGS. 3 and 4 show an embodiment, in the case of which two shielding elements 64, 64' are supported on the second housing element 52 of the connecting housing 30. Each of the shielding elements 64, 64' has a plurality of first connecting moldings 68, in the region of which the respective shielding elements 64, 64' are fixed, for example, by way of an integrally joined connection once again on the respective second connecting moldings 76 of the second housing element 52.

The two shielding elements 64, 64' adjoin one another in an adjoining region 78, and overlap one another in the adjoining region 78 in such a way that there is a spacing between them even in the mutually overlapping sections of the shielding elements 64, 64'. It is therefore ensured even in the adjoining region 78 that the shielding elements 64, 64' cannot come into contact with one another and rattling noise therefore cannot occur.

In the case of the embodiment which is shown in FIGS. 3 and 4, it can be provided, for example, that the shielding element 64 is supported on the connecting housing 30 substantially on that region of the second housing element 52 which lies opposite the inlet opening 34, whereas the connecting element 64' is supported on the connecting housing 30 substantially on that region of the second housing element 52 which lies opposite the outlet opening 36. The adjoining region 78 of the two shielding elements 64, 64' can be positioned substantially in that region of the second housing element 52 which is positioned so as to lie opposite the transition region 60 of the first housing element 32.

Figure 5:
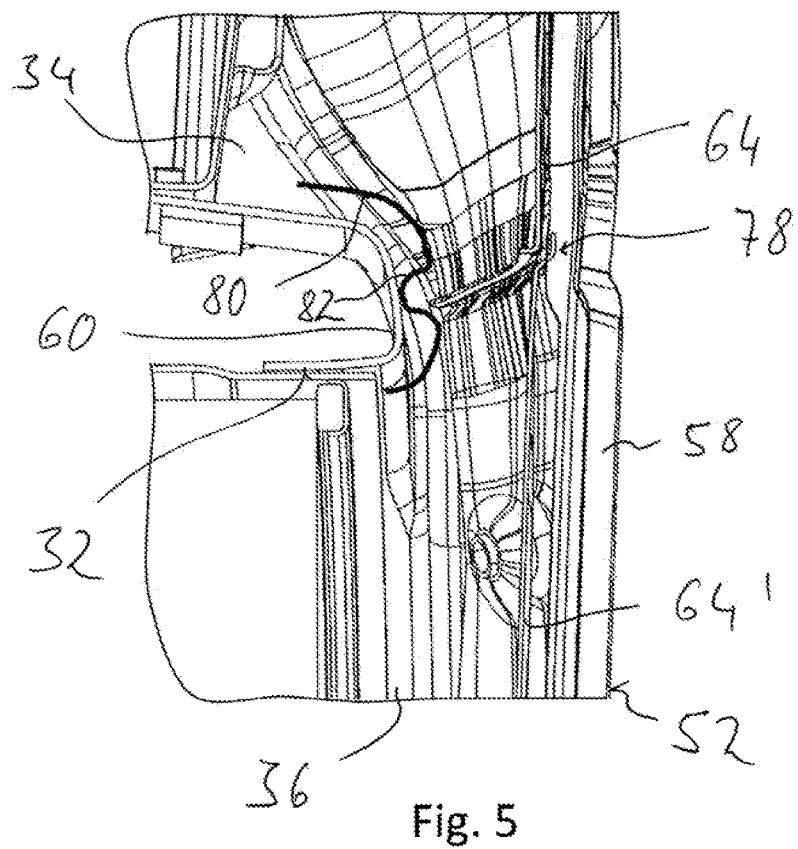
FIG. 5 shows a detailed view of the connecting housing in the transition region of a first housing, providing an inlet opening and an outlet opening, of the connecting housing with a shielding element which is provided in this transition region; and, FIG. 6 shows a sectional illustration of an inlet housing of the exhaust gas system from FIG. 1 with a shielding element which is supported thereon.

FIG. 5 shows an embodiment, in the case of which, as an alternative or in addition to the provision of one or more connecting elements 64, 64' on the second housing element 52 of the connecting housing 30, a shielding element 80 which shields the transition region 60 is also provided on the first housing element 32, in particular on the transition region 60 between the inlet opening 34 and the outlet opening 36, and is fixed thereon by way of an integrally joined connection, for example welding, in the region of one or more connecting moldings 82. Therefore, in the case of this embodiment, substantially the entire inner surface of the connecting housing 30, against which the exhaust gas can flow, can be shielded against the direct incident flow with exhaust gas.

Figure 6:
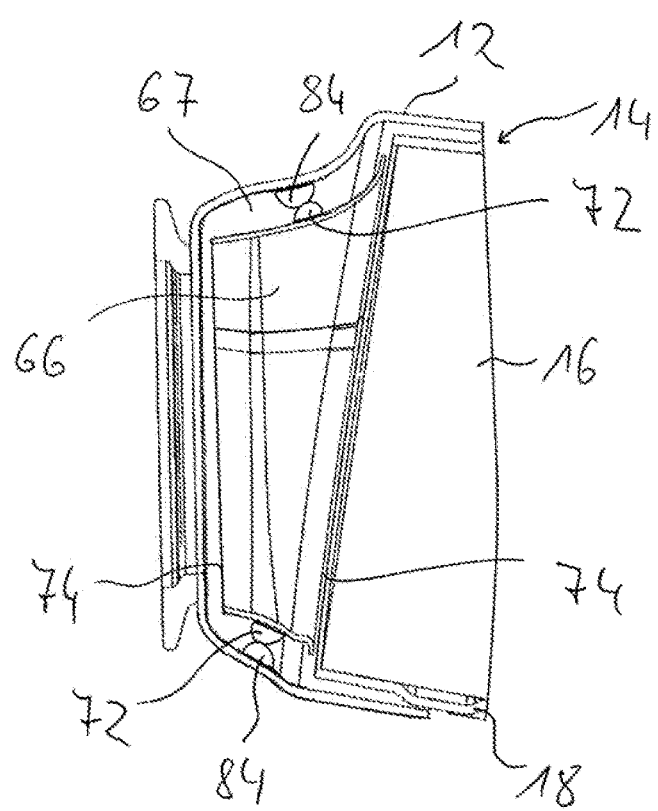

FIG. 6 shows a modification of the embodiment, shown in FIG. 1, of the shielding element 66, assigned to the inlet housing 12, or the inlet housing 12. In the case of this modification, connecting moldings 84 are also provided on the inlet housing 12 in a manner which is assigned to the connecting moldings 72 on the shielding element 66. A second connecting molding 84 of the inlet housing 12 is preferably provided in a manner which is assigned to each first connecting molding 72 of the shielding element 66, with the result that a fixed connection can be achieved between the shielding element 66 and the inlet housing 12 in the region of each player consisting of a first connecting molding 72 provided on the shielding element 66 and a second connecting molding 84 provided on the inlet housing 12. Therefore, an intermediate space 67 of comparatively great dimensions can also be achieved between the shielding element 66 and that wall of the inlet housing 12 which lies opposite it by way of connecting moldings 72, 84 of comparatively small dimensions.

The present invention provides a construction of an exhaust gas system, in the case of which efficient shielding of one or more outer walls of components of the exhaust gas system can be achieved by way of structurally simple measures. Since the direct incident flow by way of exhaust gas can be as far as possible ruled out, in particular in regions which are critical in this regard, heat losses to the outside are reduced and therefore the efficiency of an exhaust gas system for exhaust gas purification is increased. Furthermore, the risk that heat is transferred to other system regions of the vehicle is reduced, as a result of which it becomes possible for system regions of this type to be positioned more closely to the exhaust gas system.

Since the shielding elements which are to be used according to the invention are connected only in discrete regions to the components which support them or their outer walls, excessive loading which occurs with consideration of the thermal expansions is avoided both in the region of the shielding elements and in the region of the components which support them, and also in the region of the respective integrally joined connections. A thermomechanically durable embodiment which is also resistant to the chemical loading by way of the exhaust gases is achieved. In particular, the provision of a plurality of shielding elements which adjoin one another and overlap one another makes efficient shielding possible even in the case of relatively complex geometries of the components which support shielding elements of this type, it also being possible to reduce the loading, produced by way of thermal expansions, of the regions, in which a respective shielding element is connected to a component which supports it, by way of the provision of a plurality of shielding elements which are separated from one another and preferably do not make contact with one another.

Finally, it is to be noted that, within the context of the present invention, an outer wall, in particular an outer wall which is shielded by way of a shielding element against direct incident flow by way of exhaust gas, is a wall which is such that it encloses a volume, in which exhaust gas flows, and therefore can or could be in direct contact with the exhaust gas. An outer wall of this type can be exposed to the surroundings on the outer side which faces away from the volume, through which exhaust gas flows, but can also be covered by other components, for example, of the exhaust gas system and can be in direct contact with them.

It is understood that the foregoing description is that of the preferred embodiments of the invention and that various changes and modifications may be made thereto without departing from the spirit and scope of the invention as defined in the appended claims.

What is claimed is:

1. An exhaust gas system for an internal combustion engine, the exhaust gas system comprising:

a first exhaust gas treatment unit having an upstream inlet region and a downstream outlet region;
at least one second exhaust gas treatment unit having an upstream inlet region and a downstream outlet region; and,
a connecting housing connected to said downstream outlet region of said first exhaust gas treatment unit and to said upstream inlet region of said second exhaust gas treatment unit, said connecting housing including a first housing element having an inlet opening and an outlet opening, said downstream outlet region of said at least one first exhaust gas treatment unit being connected to said connecting housing in a region of said inlet opening of said first housing element, said upstream inlet region of said at least one second exhaust gas treatment unit being connected to said connecting housing in a region of said outlet opening, said connecting housing including a second housing element which, with said first housing element, encloses a connecting volume, through which exhaust flows;
a component provided by said connecting housing and having an outer wall delimiting said connecting volume, said outer wall including said first housing element and said second housing element;
said outer wall having an inner side facing said connecting volume;
said component supporting at least two shielding elements on said inner side of said outer wall, a first shielding element and a second shielding element of said at least two shielding elements being arranged in an adjoining region wherein they mutually partially overlap and conjointly define an intermediate space therebetween, said first and second shielding elements being provided on an inner side of said second housing element in a region which lies in accordance with at least one of the following:
i) opposite said inlet opening;
ii) opposite said outlet opening; and,
iii) opposite a transition region formed between said inlet opening and said outlet opening; and,
said outer wall and said at least two shielding elements conjointly defining an intermediate space therebetween;
said exhaust gas system further including:
at least one first connecting molding provided on a shielding element of said at least two shielding elements and directed toward said outer wall; and,
at least one second connecting molding provided on said outer wall and directed toward a shielding element of said at least two shielding elements and fixedly connected to said at least one first connecting molding.

2. The exhaust gas system of claim 1, wherein at least one of the following applies:

i) said at least one shielding element is a sheet metal molding; and,
ii) said at least one shielding element has a thickness lying in a range of 0.6 mm to 1.0 mm.

3. The exhaust gas system of claim 2, wherein said at least one shielding element has a thickness of 0.8 mm.

4. The exhaust gas system of claim 1, wherein at least one of the following applies:
i) said outer wall includes at least one sheet metal molding; and,
ii) said intermediate space has a dimension lying in a range of 0.5 mm to 6.0 mm.

5. The exhaust gas system of claim 1, wherein said at least two shielding elements further define an outer edge region positioned at a spacing from said outer wall.

6. The exhaust gas system of claim 1, wherein, at least at one of said connecting moldings, a shielding element of said at least two shielding elements is connected to said outer wall via material joining.

7. The exhaust gas system of claim 6, wherein said material joining provided is welding.

8. The exhaust gas system of claim 1, wherein said at least two shielding elements overlap one another in a region which lies opposite said transition region of said first housing element.

9. The exhaust gas system of claim 1, wherein a further shielding element of said at least two shielding elements is provided on said first housing element in a region of said transition region.

10. The exhaust gas system of claim 1, further comprising an inlet housing arranged upstream of said first exhaust gas treatment unit; and, said upstream inlet region of said first exhaust gas treatment unit being connected to said inlet housing.

11. The exhaust gas system of claim 10, wherein said inlet housing provides a further component having an outer wall with an inner side delimiting an exhaust gas flow volume and supporting a further shielding element.

12. The exhaust gas system of claim 1, wherein at least one of the following:
i) said first exhaust gas treatment unit includes an oxidation catalytic converter;
ii) said first exhaust gas treatment unit includes a particle filter;
iii) said first exhaust gas treatment unit includes a Selective Catalytic Reduction catalytic converter; and,
iv) said second exhaust gas treatment unit includes a Selective Catalytic Reduction catalytic converter.

13. The exhaust gas system of claim 12, further comprising a reagent dispensing arrangement on said connecting housing for dispensing reagent into said connecting volume.

* * * * *